United States Patent
Hwang

(10) Patent No.: US 6,393,291 B1
(45) Date of Patent: May 21, 2002

(54) METHOD AND APPARATUS FOR DERIVING A HIGH RATE OUTPUT IN A GPS SYSTEM

(75) Inventor: Patrick Y. Hwang, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/277,622

(22) Filed: Mar. 25, 1999

(51) Int. Cl.⁷ .............. H04Q 7/20; H04B 7/185
(52) U.S. Cl. .............. 455/456; 342/357.06; 342/450
(58) Field of Search .............. 455/456, 13.2; 342/450, 457, 465, 357.01, 357.02, 357.06, 357.12; 701/213, 214, 215

(56) References Cited

U.S. PATENT DOCUMENTS

| | | | |
|---|---|---|---|
| 5,563,607 A | * 10/1996 | Loomis et al. | 342/357 |
| 5,764,184 A | * 6/1998 | Hatch et al. | 342/357 |
| 5,841,026 A | * 11/1998 | Kirk et al. | 73/178 R |
| 5,936,573 A | * 8/1999 | Smith | 701/213 |

* cited by examiner

Primary Examiner—Nay Maung
Assistant Examiner—Erika A. Gary
(74) Attorney, Agent, or Firm—Nathan O. Jensen; Kyle Eppele

(57) ABSTRACT

A method and apparatus are provided for deriving a position solution in a global positioning system mobile station. The method includes the steps of forming a position solution by the mobile station during a first time period based upon a first set of signal measurements made by the mobile station of signals from a set of global positioning system satellites and a corresponding first set of satellite signal measurements made by a ground-based reference station at a known location remote from the mobile station and forming a second position solution by the mobile station during a second time period based upon a second set of satellite signal measurements made by the mobile station of the set of satellites during the second time period and the corresponding first set of measurements from the reference station.

25 Claims, 7 Drawing Sheets

METHOD AND APPARATUS FOR DERIVING A HIGH RATE OUTPUT IN A GPS SYSTEM

BACKGROUND OF THE INVENTION

The field of the invention relates to navigational systems and more particularly to global positioning systems.

Global navigation satellite systems (GNSS), such as the US NAVSTAR GPS and Russian GLONASS, are known. The NAVSTAR GPS developed by the U.S. Defense Department is a satellite-based radio navigation system that transmits information from which extremely accurate navigational calculations can be made in three-dimensional space anywhere on or near the Earth. Three-dimensional velocity can be determined with equal precision. The GPS uses 24 satellites dispersed in six, inclined, 12-hour circular orbits chosen to insure continuous 24-hour coverage world wide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHZ and an L2 signal at a frequency of 1227.6 MHZ. The L1 and L2 signals are bi-phase modulated by pseudo-random noise (PRN) codes and an information signal (i.e., navigational data) encoded at 50 Hz. The PRN codes facilitate multiple access through the use of a different PRN code by each satellite.

Upon detecting and synchronizing with a PRN coded signal, a receiver decodes the signal to recover the navigational data, including emphemeris data. The emphemeris data is used in conjunction with a set of Kepler equations to precisely determine the location of each satellite. The receiver measures a phase difference (e.g., time of arrival) of signals from at least four satellites. The time differences are then used to solve a matrix of at least four equations to provide a space and time solution. The result is a precise determination of location of the receiver in three-dimensional space.

In addition to processing of the PRN codes to determine location, other techniques such as differential GPS positioning can be used to improve location accuracy of a mobile station by transmitting correction information from a reference station. Differential GPS can be used to correct the position solution of a mobile station by transmitting a correction signal to the mobile station from a reference station with a precisely know position. Kinematic GPS is a precise form of differential GPS positioning using post-processed GPS carrier phase data to determine the relative position of a mobile station with respect to a reference station.

In differential and kinematic GPS system, measurements made by the mobile station receiver must be time matched to those made by the reference station receiver to produce a single solution of position of the mobile station. In a real time system there is latency in the position solution computed from the pairing of measurements resulting from delays encountered in transporting the data from the reference station site to the mobile site. If the solution rate needs to be increased, the transport rate must also be increased accordingly. A real time implementation of the differential and kinematic GPS system would require a high bandwidth data link to minimize solution latency and accommodate high rate solution computations. The problem is then one of how to obtain a solution with minimal latency that may also be produced at high rates, while only using a low-bandwidth data link.

SUMMARY OF THE INVENTION

The present invention is directed to a method and apparatus for deriving high-rate data output with minimal latency when using a low-bandwidth data link for transporting code and carrier phase corrections or code and carrier phase measurements in a real-time differential and kinematic GPS system. What is disclosed is a method and apparatus for deriving a position solution in a global positioning system mobile station. The method includes forming a position solution in the mobile station during a first time period based upon a first set of signal measurements made by the mobile station of signals from a set of global positioning system satellites and a corresponding first set of satellite signal measurements made by a ground-based reference station at a known location remote from the mobile station. A second position solution is formed by the mobile station during a second time period based upon a second set of satellite signal measurements made by the mobile station of the set of satellites during the second time period and the corresponding first set of measurements from the reference station.

It is therefore an object of the present invention to provide a global positioning system with improved accuracy by the use of differential and kinematic techniques.

It is another object of the present invention to provide the improved accuracy at high rate.

It is a feature of the present invention to provide the improved GPS accuracy at a high rate without the use of wide bandwidth data links to transmit the GPS differential and kinematic correction data.

It is an advantage of the present invention to use low bandwidth data links such as cellular telephones to transmit the GPS differential and kinematic correction data from a reference station to a mobile station.

These and other objects, features, and advantages are disclosed and claimed in the specification, figures, and claims of the present application.

BRIEF DESCRIPTION OF THE DRAWINGS

The invention will now be described by way of example only with reference to the accompanying drawings in which.

DETAILED DESCRIPTION OF PREFERRED EXEMPLARY EMBODIMENTS

Figure 1:
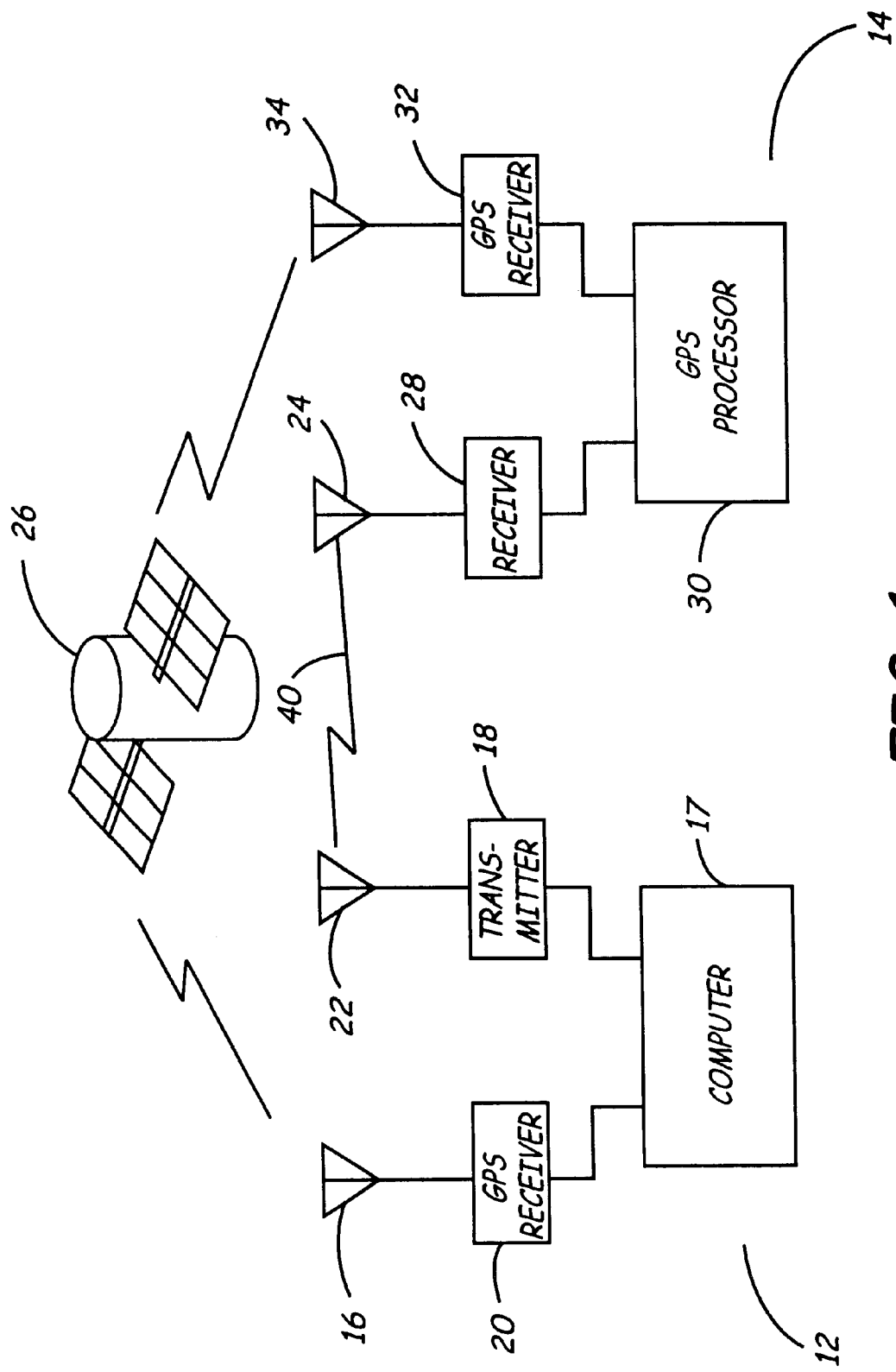
FIG. 1 is a block diagram of a global positioning system in accordance with an embodiment of the invention.

FIG. 1 is a block diagram of a global positioning system (GPS) 10 under an illustrated embodiment. Under the embodiment, a number of satellite vehicles (SVs) 26 transmit navigational signals to reference station 12 and mobile station 14. The reference station 12 includes GPS receiver 20 and antenna 16 and is positioned at a known location. The known location of a reference station 12 is compared to the GPS position solution to calculate correction information. This correction information is transmitted to the mobile station 14.

The mobile station 14 may be located in an automobile or in an airplane. The mobile station 14 contains a GPS processor 30, GPS receiver 32, and GPS antennas 34. The mobile station 14 uses the correction information transmitted from the reference station 12 to form a more accurate position solution. The mobile station 14 receives correction data over a radio frequency (RF) data link 40. The RF data link may be established through use of cellular telephone technology including a transmitter 18 and antenna 22 in the reference station 12 and receiver 28 and antenna 24 in the mobile station 14. The RF data link may use a low-bandwidth such as less than 5 kilohertz.

The mobile station 14 GPS processor 30 forms position solutions under a number of modes. Under a first mode, the mobile station 14 forms a position solution based solely upon the detection and processing of signals from four or more SVs 26. Under a second mode, the mobile station 14 forms a more accurate solution based upon correction data (e.g., pseudorange, carrier phase, etc.) received from the reference station 12 regarding each SV 26.

In another mode, the mobile station 14 forms very accurate position solutions at a relatively rapid rate based upon the intermittent receipt of correction data from the reference station 12. The mobile station 14 forms position solutions between events of receipt of data from the reference station 12 by combining current satellite readings from a GPS receiver 32 with past (unsynchronized) correction data for a particular SV 26 from the reference station 12.

As is well known, GPS receivers form a position solution by triangulating their position based upon a calculated distance to each of a number (e.g., four) of SVs 26. Distances between a mobile station 14 and SV 26 are typically determined by pseudorange and carrier phase measurements. Errors in those measurements (typically induced by differences in signal propagation) reduce the accuracy of those measurements.

Since a mobile station 14 and reference station 12 may be relatively close (e.g., less than 100 miles) the distance errors measured by the mobile station 14 and reference station 12 to any given SV 26 would be virtually identical. Since the reference station 12 is in a known position, the reference station is used to determine the extent of those errors and transfer the error corrections to the mobile station 14 as part of a correction message.

Figure 2:
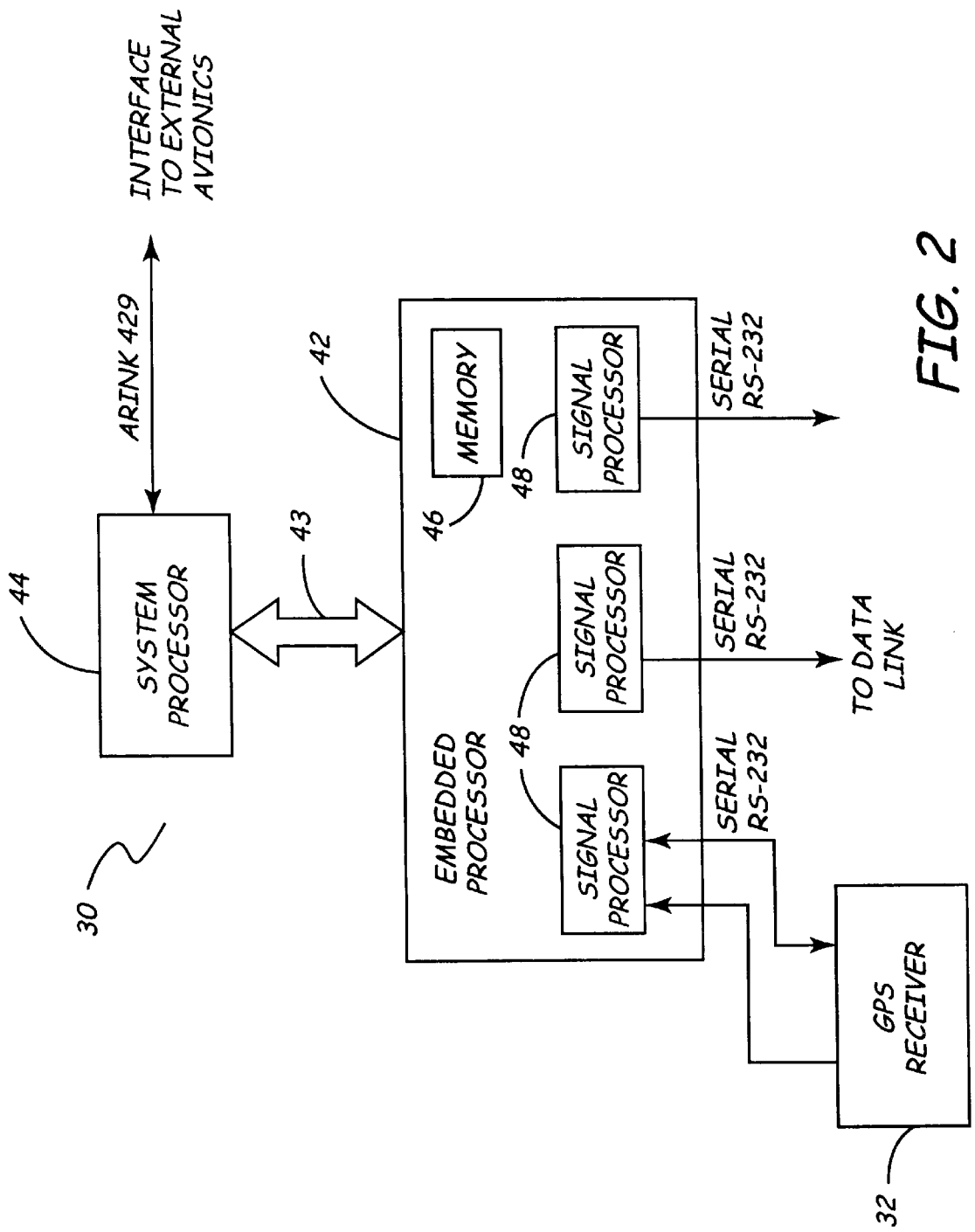
FIG. 2 is a block diagram of a GPS processor of the system of FIG. 1.

Turning now to the mobile station 14 shown in FIG. 2, the GPS processor 30 and GPS receiver 32 may be based upon any convenient GPS processor system (e.g., the SATNAV GPS-4000/GNR-900 system by Rockwell). An embedded processor 42, such as the Rockwell Commercial Avionics GPS Engine (CAGE) circuit board processor, may be provided for interfacing with the GPS engine in the GPS receiver 32. The CAGE board embedded processor 42 may be used as an applications processor and may also contain gyro monitor algorithms, attitude determination algorithms and ILS look-alike generation functions. The system processor 44 may be used mainly as an I/O processor to interface to external avionics equipment via an ARINC 429 interface.

The embedded processor 42 may be a modified version of a CAGE GPS receiver. On the receiver board, the RF/IF portion of the receiver is discarded, but its Rockwell AAMP5 processor is fully utilized for all the kinematic and navigation computations, and its three Rockwell RAVEN signal processor ASICs 48 transformed into serial I/O interface chips. A memory 46 contained in the embedded processor 42 is used for storing GPS measurements and correction data.

Of the three available RS-232 serial ports of the embedded processor 42, one may be connected to a GPS receiver 32 and the other is connected to a data link that relays correction data from a reference base station 12 located elsewhere. The hardware provided is configurable for any of the two functions described herein, real-time kinematic position determinations and high-accuracy differential GPS (HADGPS).

The embedded software satisfies an important design criterion in that the two functions are accommodated by operating a single software link. The SATNAV GPS software provides an inherent parallel bus interface 43 to the system processor board 44.

The embedded processor software is designed to perform several different functions with a single software link. In such a design approach, common functional software blocks are shared for the different functions to minimize code and memory requirements. The two functions mentioned above are real-time kinematic processing and high-accuracy differential processing.

Figure 3:
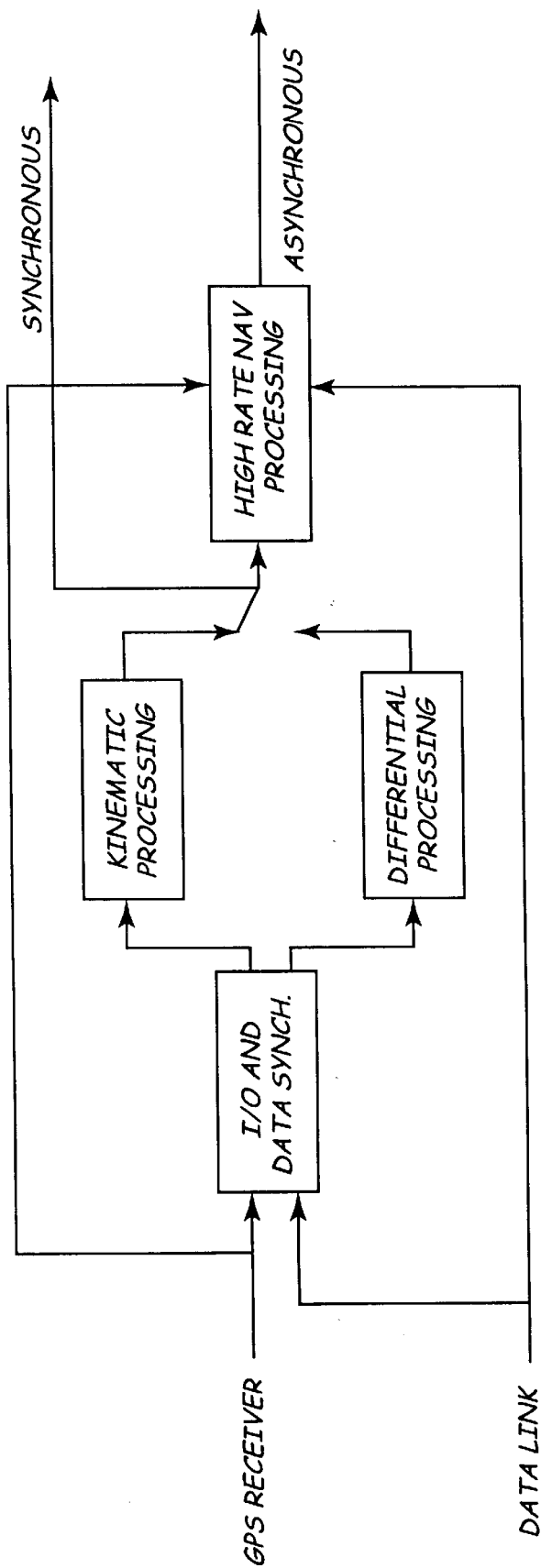
FIG. 3 is a block diagram depicting signal processing in the real-time kinematic mode of the system of FIG. 1.
Figure 4:
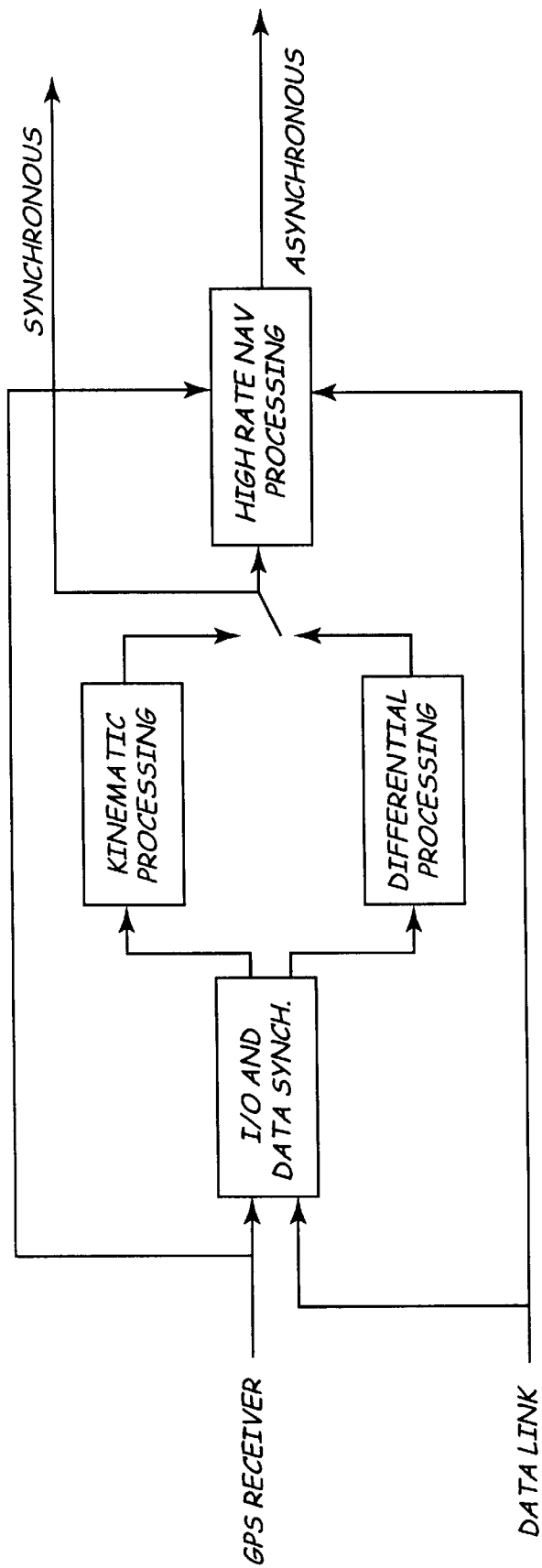
FIG. 4 is a block diagram depicting signal processing in the high-accuracy differential mode of the system of FIG. 1.

In the real-time kinematic mode shown in FIG. 3, data is accepted from GPS receiver 32 and data link 40. The data is processed through the kinematic algorithms to produce a synchronous solution, but another level of processing may be used to produce a high-rate asynchronous solution. In the high-accuracy differential mode shown in FIG. 4, the set up closely follows the real-time kinematic mode, except that the data is processed by a different set of differential algorithms instead of the kinematic algorithms. Additional processing is also used to provide a high-rate differential GPS asynchronous solution.

Figure 5:
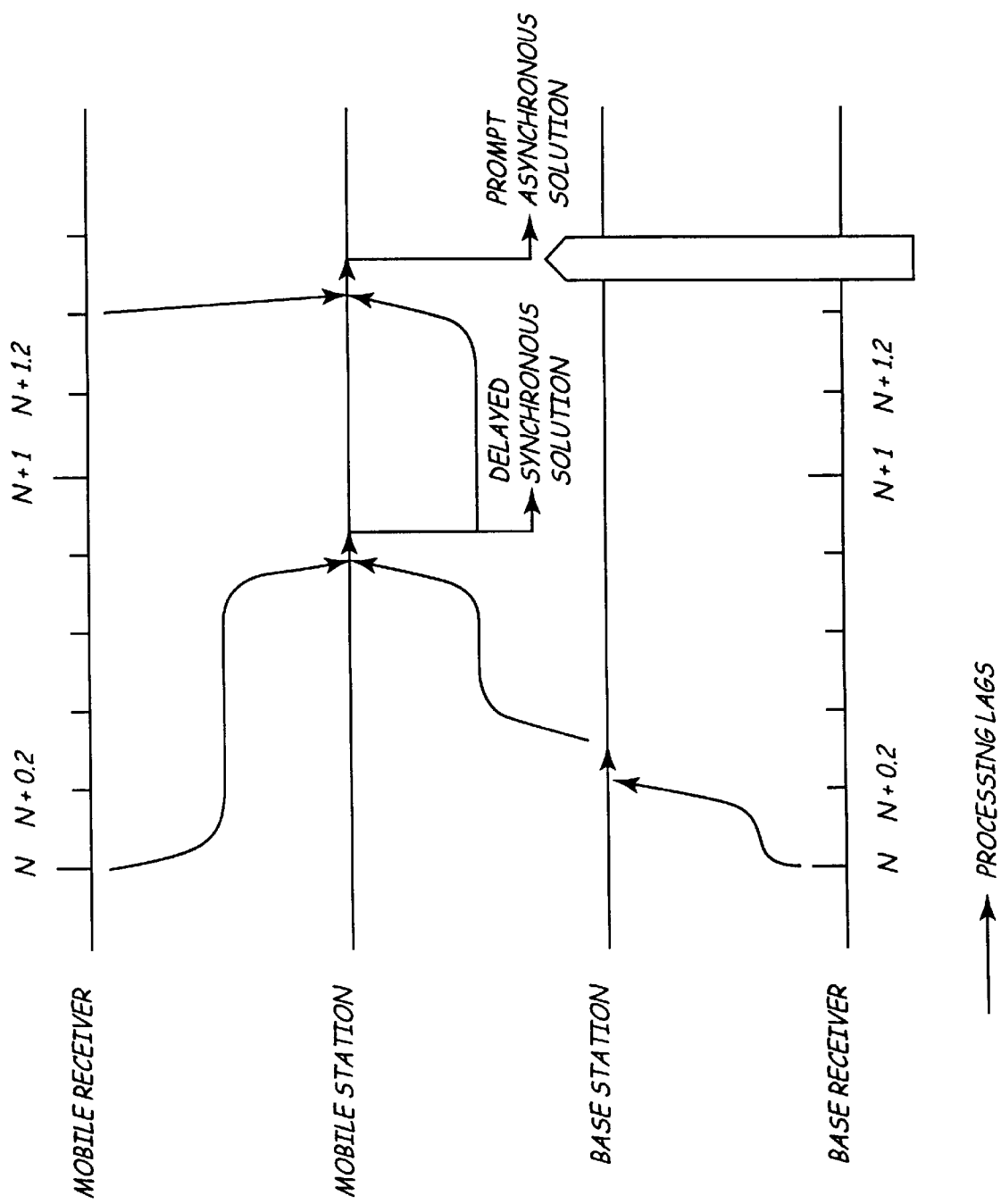
FIG. 5 is a timing diagram depicting the operating of the high-rate navigation function used by the system of FIG. 1.

High-rate navigation processing retains the classical approach to kinematic and differential GPS but additionally introduces a companion solution to overcome the problems of a real-time implementation. A timing diagram is shown in FIG. 5 to describe the innovation. In it, the activities in the reference station computer 17 and GPS receiver 20 and the mobile station GPS processor 30 and GPS receiver 32 are shown alongside one another. Measurements made simultaneously by the reference station and mobile station receivers at time N are combined in processing to produce a position solution nearly a second later at about N+1. The first set of carrier phase and pseudorange measurements made by the mobile station 14 and the corresponding set of carrier phase and pseudorange measurements made by the reference station 12 result in a solution that is the delayed synchronous solution because it is one made from synchronized measurements but its availability is delayed. This process is executed at a slow measurement rate such as 1 Hz and the measurements used are those of N, N+1, N+2, etc where N=1 second. Other slow measurement rates and measurement time intervals can be used.

A measurement from the mobile station 14 is made at a later time such as N+1.4 as depicted in FIG. 5. The time N+1.4 is used as an example and this measurement can be made at other times. This measurement is combined in processing with the delayed synchronous solution to form a prompt asynchronous solution a short time after N+1.4. The second position solution can be considered prompt since it is valid for the time N+1.4 and available shortly after, but it is made up of asynchronous elements. Its accuracy is slightly compromised but its immediacy makes it useful in particular for guidance applications. This process runs at the measurement output rate, which may be 1 Hz, 2 Hz, 5 Hz, or 10 Hz or any similar rate depending on the measurement rate set for the mobile station receiver.

Figure 6:
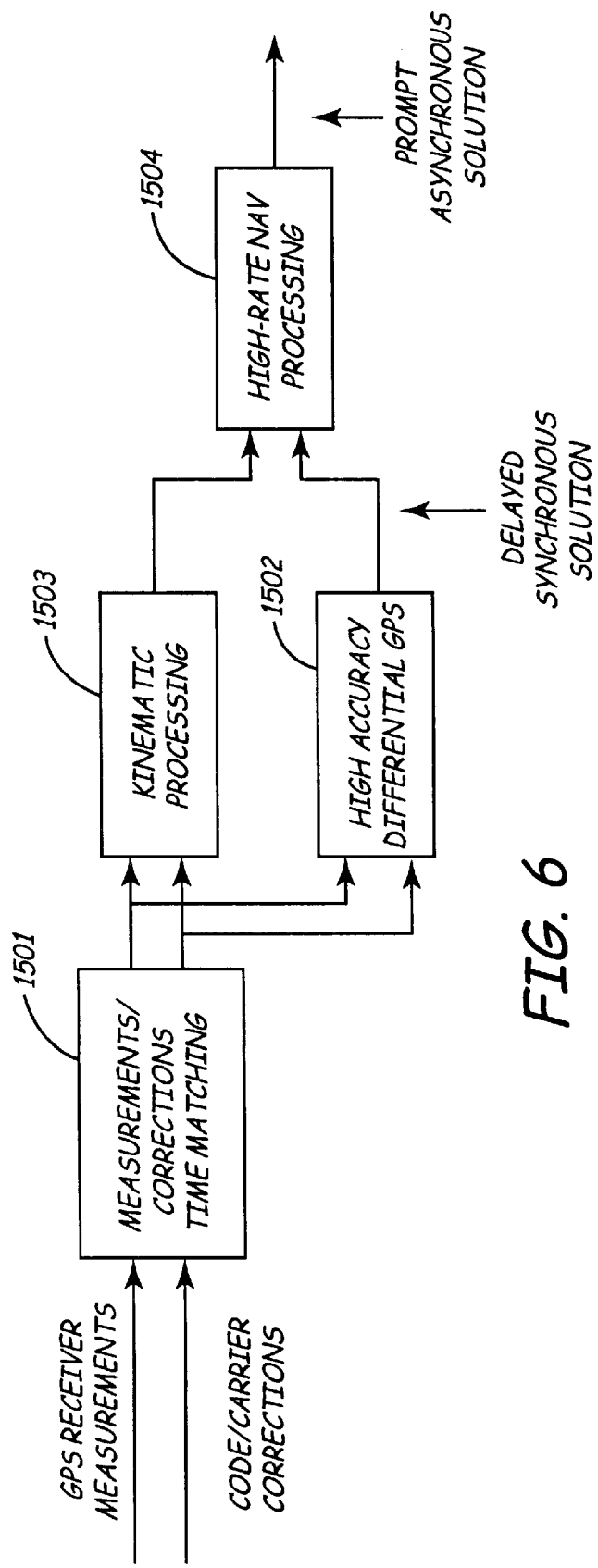
FIG. 6 is a signal flow diagram depicting signals processed in a high accuracy differential mode by the system of FIG. 1.

The relationship of the functions within the embedded software is shown in FIG. 6. Code tracking and carrier phase measurements from the GPS receiver 32 and the code and carrier phase corrections obtain from the data link 40 are processed in block 1501 where the measurements are time matched with the corrections. The high-accuracy differential GPS (HADGPS) block 1502 in FIG. 6 utilizes code-tracking measurements (pseudoranges) to derive sub-meter relative accuracy. The HADGPS solution can provide a coarse initial value for the real-time kinematic process or be used by itself. Kinematic processing, block 1503, controls the real-time kinematic (RTK) functions. When carrier phase data are available, single and double differences of the phase measurements are formed for processing in a kinematic Kalman filter to produce a position and velocity solution. Prior to the resolution of initial integer ambiguities, the Kalman filter also estimates those ambiguities alongside position and velocity. In that mode, the Kalman filter estimates are, in turn, used for processing an integer-constrained search algorithm that determines the correct set of integer ambiguities.

Figure 7:
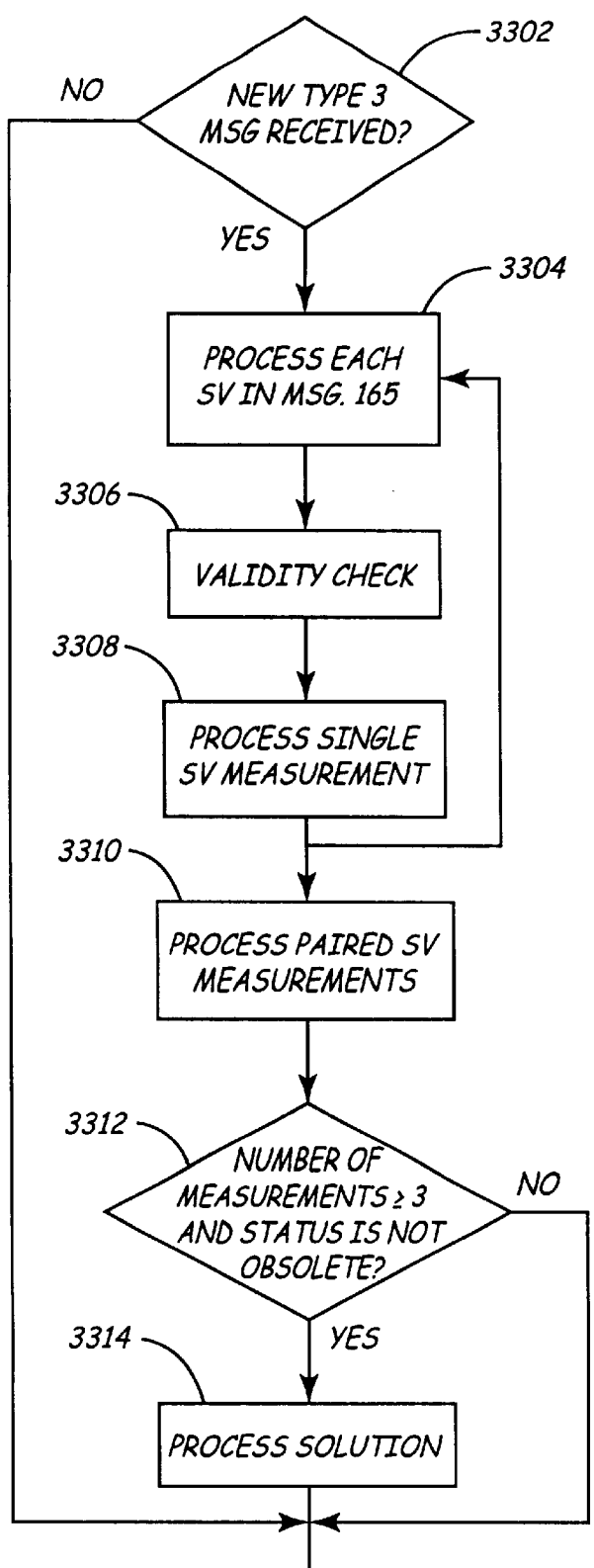
FIG. 7 is a flow chart depicting processing steps for high-rate navigational processing used by the system of FIG. 1.

The high-rate navigation processing function of the present invention is shown as block 1504 in FIG. 6. The software process for forming a high-rate navigation processing solution in the mobile station between readings from the reference station 12 is shown in FIG. 7. High-rate navigation processing is done in the positioning mode when new carrier phase data is received 3302 from a GPS receiver 32 in Message 165. This processing function 3304 is intended to extract the current positioning information from the new Msg 165 and compare it against a reference record of data established within the last few seconds to generate a solution that reflects position change over this time interval. This reference record is updated at the end of the kinematic processing function 1503 in FIG. 6. High-rate navigation processing is performed in both the kinematic and DGPS modes.

During processing, a validity check is performed (step 3306) on each satellite. For each satellite ID in Message 165, indication is made that it is a visible satellite on this cycle by setting Vis_Sv_Set (Svid) to "true". If Svid is also in the reference record, the following validity checks must all pass in order to use the data:

1. carrier phase for Svid is valid in Message 165 and in the reference record,
2. ephemeris is available for Svid,
3. Vis_Sv Set (Svid) was "true" on the previous cycle and
4. the continuity count for Svid is the same as last cycle.

As a part of the validity check a comparison is made of time differences. If all validity checks pass the time difference (step 3312) in seconds between the measurement message time and the time tag for the reference record, the position solution is computed at step 3314. The status of this high-rate navigation computation is assessed according to the following criteria:

$\Delta t \leq 5$: status=current
$5 < \Delta t \leq 15$: status=latent
$15 \leq \Delta t$: status=invalid If all validity checks pass, the following measurement is processed at step 3308:

$$r = \phi - d$$

where:
r=a single-receiver, single-satellite residual,
$\phi$=carrier phase measurement in cycles and
d=geometric range from user to satellite minus satellite clock correction.

Paired SV measurements are then processed (FIG. 7 step 3310). The main equation to compute residual differences across SVs is:

$$\delta = (r_{sv1} - r_{sv2}) - (s_{sv1}^{ref} - s_{sv2}^{ref}) - (X_{sv1}^{ref} - X_{sv2}^{ref}) - (\dot{X}_{sv1}^{ref} \dot{X}_{sv2}^{ref}) \Delta t$$

where:
r=single-receiver single-satellite residual as computed above,
s=single difference measurement captured in the reference record ($\Delta\phi$), X=carrier phase correction captured in the reference record ($\phi_2$) and $\dot{X}$=carrier phase correction rate computed from a simple finite time difference equation: $\dfrac{X_k - X_{k-1}}{t_k - t_{k-1}}$.

Next, a position solution is processed as shown in FIG. 7 step 3314. The position change is obtained by a least-squares solution:

$$\Delta x = (\nabla H^T \nabla H)^{-1} \nabla H^T \delta$$

The prompt asynchronous second position solution is then obtained by adding the position change $\Delta x$ to the delayed synchronous first position solution in the reference record $x_0$.

$$x = x_0 + \Delta x$$

Specific embodiments of methods and apparatus of deriving a high-rate output in a GPS receiver according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of deriving a high-rate position solution in a global positioning system, such method comprising the steps of:
    forming a delayed synchronous position solution by a mobile station based upon a first set of satellite signal measurements made at a first time by the mobile station of signals from a set of global positioning system satellites and a first set of satellite signal measurements made at the first time by a reference station at a known location remote from the mobile station; and
    forming a prompt asynchronous position solution by the mobile station at a second time based upon a second set of satellite signal measurements made by the mobile station of signals from the set of satellites at the second time and the first set of measurements made by the reference station at the first time.

2. The method of deriving the high-rate position solution as in claim 1 further comprising transferring the first set of measurements made by the reference station to the mobile station using a wireless data link.

3. The method of deriving the position solution as in claim 2 further comprising transmitting the first set of measurements made by the reference station to the mobile station using a data link with a bandwidth capacity of less than five kilohertz.

4. The method of deriving the position solution as in claim 1 further comprising measuring carrier phase data of the set of global positioning system satellites by the reference station and including the measured carrier phase data as part of the first set of measurements made by the reference station.

5. The method of deriving the position solution as in claim 4 further comprising measuring pseudorange data of the set of global positioning system satellites by the reference station and including the measured carrier phase data as part of the first set of measurements made by the reference station.

6. The method of deriving the position solution as in claim 5 wherein the step of forming a prompt asynchronous position solution further comprises correcting a position error based on differential processing of the measured pseudorange data and carrier phase data.

7. The method of deriving the position solution as in claim 6 wherein the step of forming a prompt asynchronous position solution by the mobile station further comprises calculating a change of position of the mobile station between the first and second time.

8. The method of deriving the position solution as in claim 4 wherein the step of forming a prompt asynchronous position solution further comprises correcting a position error based upon kinematic processing of the measured carrier phase data.

9. The method of deriving the position solution as in claim 8 wherein the step of forming a prompt asynchronous position solution by the mobile station further comprises calculating a change of position of the mobile station between the first and second time.

10. The method of deriving the position solution as in claim 8 wherein the step of correcting a position error based upon kinematic processing further comprises determining a carrier phase difference between the measured signals of the mobile station and the measured signals of the reference station.

11. Apparatus for deriving a position solution in a global positioning system, such apparatus comprising means for forming a delayed synchronous position solution by a mobile station based upon a first set of satellite signal measurements made at a first time by the mobile station of signals from a set of global positioning system satellites and a first set of satellite signal measurements made at the first time by a reference station at a known location remote from the mobile station and for forming a prompt asynchronous position solution by the mobile station at a second time based upon a second set of satellite signal measurements made by the mobile station of signals from the set of satellites at the second time and the first set of measurements made by the reference station at the first time.

12. The apparatus for deriving the position solution as in claim 11 further comprising means for transferring the first set of measurements made by the reference station to the mobile station.

13. The apparatus for deriving the position solution as in claim 12 wherein the means for transferring further comprises means for transmitting the first set of measurements made by the reference station to the mobile station using a bandwidth capacity of less than five kilohertz.

14. The apparatus for deriving the position solution as in claim 11 further comprising means for measuring carrier phase data of the set of global positioning system satellites by the reference station and including the measured carrier phase data as part of the first set of measurements made by the reference station.

15. The apparatus for deriving the position solution as in claim 14 further comprising means for measuring pseudorange data of the set of global positioning system satellites by the reference station and including the measured pseudorange data as part of the first set of measurements made by the reference station.

16. The apparatus for deriving the position solution as in claim 15 wherein the means for forming a prompt asynchronous position solution further comprises means for correcting a position error based upon differential processing of the measured pseudorange and carrier phase data.

17. The apparatus for deriving the position solution as in claim 15 wherein means for forming a position solution by the mobile station at a second time further comprises means for calculating a change of position of the mobile station between the first and second time.

18. The apparatus for deriving the position solution as in claim 15 wherein the means for forming a prompt asynchronous position solution further comprises means for correcting a position error based upon kinematic processing of the measured carrier phase.

19. The apparatus for deriving the position solution as in claim 18 wherein the means for correcting a position error based upon kinematic processing further comprises means for determining a carrier phase difference between the measured signals of the mobile station and the measured signals of the reference station.

20. Apparatus for deriving a position solution in a global positioning system, such apparatus comprising:
    a mobile station;
    a ground-based reference station at a known location remote from the mobile station;
    a global positioning system receiver in the mobile station for receiving global positioning system satellite signals;
    a global positioning system processor in the mobile station that forms a delayed synchronous position solution by the mobile station based upon a first set of global positioning system satellite signal measurements made at a first time by the mobile station of signals from a set of global positioning system satellites and a first set of satellite signal measurements made at the first time by the ground-based reference station; and
    a memory in the global positioning system processor that stores the first set of measurements made by the reference station at the first time to form a prompt asynchronous position solution by the mobile station at a second time based upon a second set of satellite signal measurements made by the mobile station of signals from the set of satellites at the second time and the first set of measurements made by the reference station at the first time.

21. The apparatus for deriving the position solution as in claim 20 further comprising a wireless data link that transfers the first set of measurements made by the reference station during the first time period to the mobile station.

22. The apparatus for deriving the position solution as in claim 21 wherein the wireless data link that transfers the first set of measurements further comprises a narrow bandwidth communications channel that transmits the first set of measurements made by the reference station during the first time period to the mobile station using a bandwidth capacity of less than five kilohertz.

23. The apparatus for deriving the position solution as in claim 21 wherein the wireless data link further comprises:

a transmitter coupled to the reference station for transmitting the first set of measurements; and a receiver coupled to the mobile station for receiving the first set of measurements from the transmitter.

24. The apparatus for deriving the position solution as in claim 22 wherein the reference station further comprises:

a global positioning system receiver for measuring pseudorange data and carrier phase data of the set of global positioning system satellites; and a computer for including the measured pseudorange data and the carrier phase data as part of the first set of measurements.

25. A method of forming a solution for a position of a mobile station in a global positioning system, such method comprising the steps of:

measuring a set of signals by the mobile station from a set of satellites at a first time;

measuring a first set of signals by a reference station at a known location from the set of satellites at the first time;

receiving the first set of signal measurements by the mobile station from the reference station;

forming a delayed synchronous solution for a position of the mobile station at the first time based upon the received first set of signal measurements from the reference station and the measured set of signals by the mobile station;

measuring a set of signals by the mobile station from the set of satellites at a second time;

developing an estimate of mobile station movement by the mobile station between the first time and second time based upon the received first set of measurements from the reference station at the first time and measurements of the set of signals by the mobile station at the second time; and forming a prompt asynchronous solution for a position of the mobile station at the second time based upon the estimate of the movement.

* * * * *